United States Patent Office 2,803,917
Patented Aug. 27, 1957

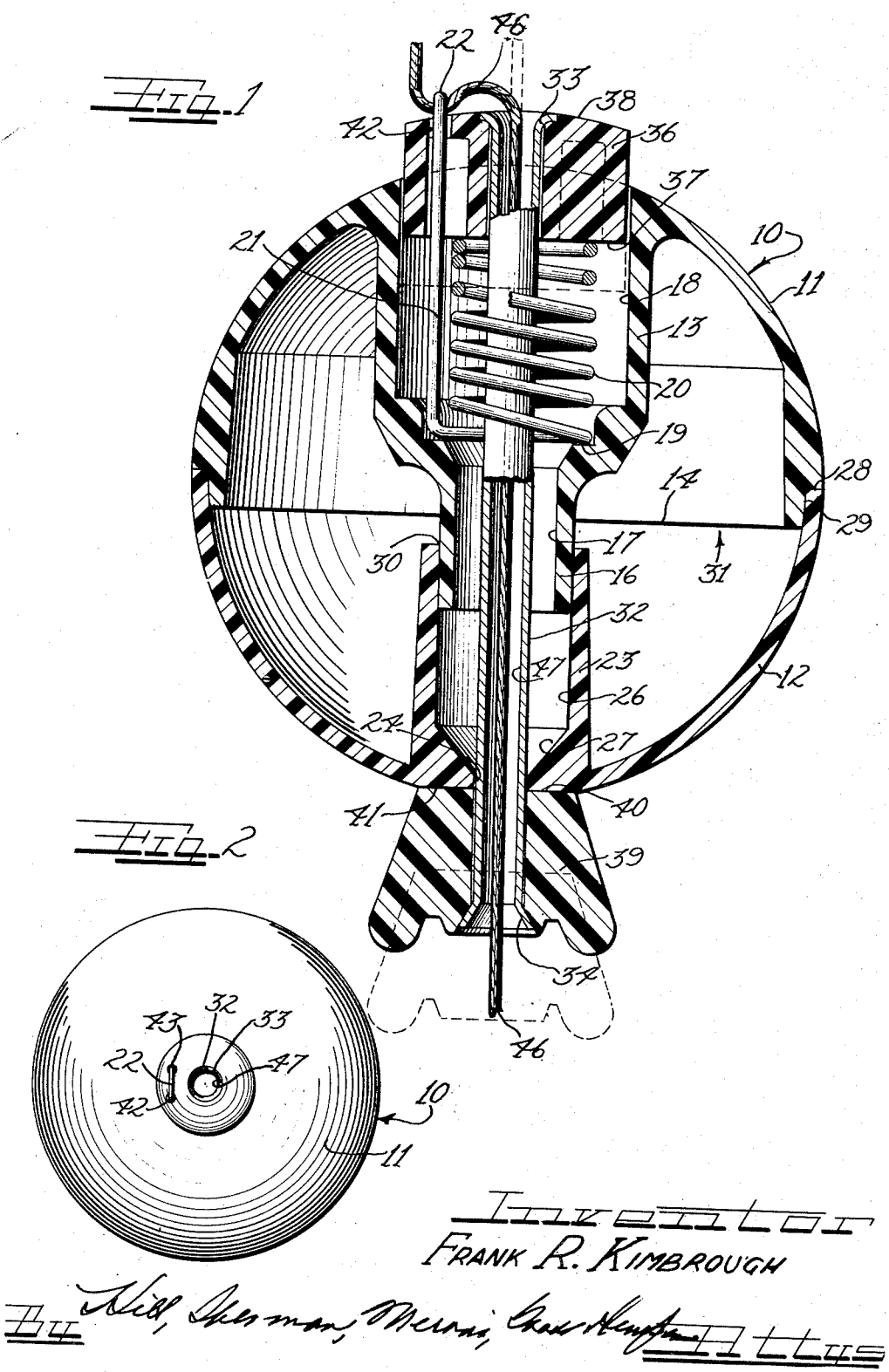

2,803,917

QUICK ATTACHING TYPE FISHING FLOAT

Frank R. Kimbrough, Richmond, Va., assignor to Ideal Fishing Float Company, Inc., Richmond, Va., a corporation of Virginia Application November 30, 1954, Serial No. 471,985

5 Claims. (Cl. 43—44.87)

This invention relates to a fishing float which is not only readily adjustable along the length of a fishing line but which may be conveniently used as a slip float.

According to the principles of the present invention, a hollow buoyant body having a bore extending therethrough has one end of the bore counterbored to receive a coiled compression spring having a vertically bent upwardly directed portion extending through an aperture in the head of a plunger slidably carried in the counterbore. A reduced diameter tubular portion connected to the plunger extends through the bore of the buoyant body and has attached thereto at the opposite end thereof outside of the buoyant body a finger manipulable button. At the end of the vertically bent wire there is formed a hook which engages against the plunger to clamp a fishing line therebetween. By manipulating the button and by pulling the plunger into the counterbore the hook will be selectively exposed so that the fishing line may be quickly adjusted in an adjusted clamping position. If it is desired to use the float as a slip float, the fishing line is merely passed through the tubular bore of the device.

It is an object of the present invention, to provide a quick attaching type fishing float which may be conveniently adjusted along the length of a fishing line or which may be selectively used as a slip type float.

Another object of the present invention is to provide an improved form of fishing float which is made of sturdy components capable of withstanding rugged use and which will be completely efficient for the purposes to which the fishing float is applied.

Another object of the present invention is to provide a fishing float having a resilient line clamping arrangement wherein all the spring coils are concealed within the interior of the float.

Many other features, advantages and additional objects of the present invention will become manifest to those versed in the art upon making reference to the detailed description which follows and the accompanying sheet of drawings in which a preferred structural embodiment incorporating the principles of the present invention is shown by way of illustrative example only.

In the drawings:

Figure 1 is a cross-sectional view with parts shown in elevation of a fishing float incorporating the principles of the present invention; and Figure 2 is a plan elevational view somewhat reduced in size of the fishing float shown in Figure 1.

As shown in the drawings:

The float of the present invention is indicated generally by the reference numeral 10 and comprises a pair of generally semispherical members 11 and 12, respectively, fitted together to form a float body. The float 10 is conveniently made by molding a lightweight material such as a plastic or the like and, if desired, the float body may comprise two separate colors in accordance with conventional fishing float practice.

Referring first of all to the structural details of the semispherical member 11, it will be noted that an inwardly projecting boss 13 is located on a diametral axis of the semispherical member 11. The boss 13 extends beyond the peripheral edge 14 of the semispherical member 11 and terminates in a reduced diameter neck 16 having a bore extending therethrough indicated generally at 17.

The enlarged portion of the boss 13 nearest the outermost portions of the semispherical member 11 is counterbored as at 18. Between the bore 17 and the counterbore 18, there is provided a shoulder 19 bottoming one end of a coil spring 20.

The coil spring 20 is particularly characterized by the provision of a vertically bent wire 21 formed at one end thereof and extending generally parallel to the coiling axis of the spring 20 outwardly of the counterbore 18 and outwardly of the semispherical member 11. At the outer extremity of the wire 21 there is formed a reversely turned hook portion indicated at 22.

Referring now to the structural details of the semispherical member 12, it will be noted that an inwardly projecting boss 23 is provided having formed therein a bore 24 counterbored as at 26. A shoulder 27 is formed between the bore 24 and the counterbore 26.

The boss 23 terminates inside of the peripheral edge 28 of the semispherical member 12 and it will be noted that the counterbore 26 is sized to be complementary to the outside diameter of the reduced neck 16 formed on the boss 13, thereby to facilitate a telescoping assembly of the bosses 13 and 23 when the semispherical members 12 and 11 are fitted together.

The peripheral edge portions 14 of the semispherical member 11 are also provided with an annular recess 29 which seats the adjoining peripheral edge 28 of the semispherical member 12 and when fitted together, the mated semispherical members 11 and 12 form a spherical float body which is essentially watertight. To insure sealing against leakage of fluid into the interior of the float body, a plastic solvent may be placed in the interior of the float body prior to fitting the semispherical members 11 and 12 together to insure cohesion of joining and abutting surfaces at the joints indicated at 30 and 31, respectively.

Slidably and reciprocably supported in the bore 24 of the semispherical member 12 is a tubular member 32. In this particular embodiment, the tubular member 32 takes the form of a seamless tube made of a non-corrosive metal and having its opposite end portions flared as at 33 and 34, respectively.

The flared portion 33 facilitates assembly onto one end of the tubular member 32 of a first button or plunger indicated at 36. The button 36 is generally cylindrical in configuration and is sized to be complementary to the shape of the counterbore 18, thereby to be slidably received within the counterbore 18 in the manner of a piston or plunger slidable in a cylinder or sleeve.

The button 36 is provided with an end wall 37 disposed on a flat plane and abutting against the coils of the spring 20. The opposite end wall of the button 36 is indicated at 38 and it will be noted that this wall is contoured complementary to the spherical contour of the semispherical member 11.

At the other end of the tubular member 32, there is attached a second button or finger-manipulable handle indicated at 39. The button 39 is firmly connected to the tube 32 with the flared portion 34 and is located outside of the float body with an end wall 40 abutting against an adjoining flattened wall portion 41 formed on the semispherical member 12.

The length of the tubular member 32 and the axial spacing dimension between the first and second buttons 36 and 39 is such that the coil spring 20 is preloaded. Moreover, the length of the wire 21 is selected so that the hook 22 on the extremity of the wire 21 will be received and seated in the curved wall 38 of the button 36. In this connection, it will be noted that the button 36 has a recess opening 42 formed therein through which the main portion of the wire 21 passes. A recess 43 is also formed in the curved wall 38 of the button 36 in spaced relation to the recess 42 and in this recess 43 the curved-over reversely bent portion of the hook 22 is received and seated when the button 36 is spring-biased outwardly.

In assembled position, therefore, the button 36 is partially received within the counterbore 18 and a portion thereof projects outwardly of the float body. By grasping the second button 39 with the fingers, however, the entire plunger assembly including the button 39, the tubular member 32 and the first button 36 may be moved axially against the spring bias of the coil spring 20 so that the plunger or button 36 will be wholly received within the counterbore 18 of the boss 13. Such movement will result in a relative axial movement between the wire 21 and the button 36 and the hook 22 will be completely exposed, thereby facilitating clamping of a fishing line indicated at 46 under the hook 22 and against the curved wall 38 of the button 36.

If it is desired to use the float 10 as a slip float, the fishing line 46 is merely extended through the bore 47 provided by the tubular member 32.

Although various minor modifications might be suggested by those versed in the art, it should be understood that I wish to embody within the scope of the patent warranted hereon all such modifications as reasonably and properly come within the scope of my contribution to the art.

I claim as my invention:

1. In a float, a pair of semi-spherical members of different colors fitted together to form a float body, one member having a pocket therein disposed on a diametral axis common to both of said semispherical members when fitted together, a coil spring in said pocket and having a bent end portion extending parallel to the longitudinal axis of the spring to form a wire projecting outwardly of said one member; a movable open-ended tube slidably extending through said semispherical members for movement on said diametral axis, a first button surrounding one end of said tube having concentrically outwardly spaced peripheral wall portions to radially support said tube and being slidably received in said pocket, said first button being bottomed against said coil spring and having a recess formed therein through which said wire slidably extends, said wire having a hook formed on the end thereof engaging the outside of said first button to clamp a fishing line thereunder, and a pull button surrounding the other end of said tube, said pull button having a radially outwardly extending abutment surface biased against the outside of the other semispherical member of said float body by said spring but being movable away from the body to depress said first button into said one of said semispherical members to expose said hook for clamping the fishing line, said first button and said hook being spring biased together, said tube forming a through passage in both of said semispherical members and in both of said buttons for passing a fishing line through the float for slip casting but being instantly convertible to a stationary float by locking the fishing line under said hook, said float being positionable on the fishing line with either of said semispherical members facing upwardly according to the color position desired.

2. In a fishing float, a spherical hollow buoyant body having a center bore extending therethrough, one end of said bore having a counterbore formed therein, a brass tube in said center bore providing a through hole for freely passing a fishing line when the float is used as a slip float and having a first radially outwardly extending button on one end thereof with concentric peripheral walls slidably engaging said body at said counterbore to radially position said tube and being partially received in said counterbore, a coil spring in said counterbore between said first button and said body having one end thereof forming a wire projecting through said first button and having a hook outside of said first button seated in said first button under spring bias, and a pull button outside of said body at the other end of said tube to pull said first button wholly into said counterbore, thereby exposing said hook for instantly converting said float into a stationary float by clamping the fishing line tight under the said hook.

3. In a fishing float as defined in claim 2, said body being made of two semispherical members respectively of a different color and disposed to be substantially symmetrical with respect to the axis of said tube, whereby either semispherical member may be positioned upwardly according to the color position desired.

4. In a fishing float, a hollow buoyant body having a bore extending therethrough, one end of said bore having a counterbore formed therein, a tubular member including a shank portion made of a non-corrosive metal in said bore, a first button attached to said tubular member and located at one end thereof, said first button being partially received in said counterbore to slidably support and radially position said tubular member, a coil spring in said counterbore around said tubular member and bottomed at opposite ends against said first button and against said body, respectively, to resiliently load said tubular member, said coiled spring having one end thereof bent to form a wire hook projecting out of said float through said first button, and a second button outside of said float body and connected to said tubular member at the other end thereof forming a finger manipulable pull handle by means of which said first button may be pulled wholly into said counterbore, against the bias of said spring for selectively exposing said hook, thereby to instantly convert the float from a slip float to a stationary float by clamping a fishing line between said hook and said first button.

5. A fishing float comprising two mating hollow semispherical sections fitted together to form a buoyant body, said body being provided with a centrally disposed sleeve forming an axial bore therethrough, an enlarged shouldered recess formed at one end of said bore in said sleeve, a coiled compression spring in said recess having a vertically bent upwardly directed portion and provided with a hook extremity, and a non-corrosive tube in said bore having a through opening extending therethrough for passing a fishing line when using said float as a slip float, one end of said tube having an enlarged button slidably supported in said recess and engaged by said hook extremity and the other end of said tube having a pull button formed thereon spring loaded against the outside of said body by said spring, said pull button being actuatable to instantly convert said fishing float into a stationary float by locking a fishing line between said hook extremity and said enlarged button.

References Cited in the file of this patent
UNITED STATES PATENTS

| | | |
|---|---|---|
| 2,415,692 | Huston | Feb. 11, 1947 |
| 2,591,332 | Behensky | Apr. 1, 1952 |
| 2,670,560 | Matras | Mar. 2, 1954 |